Feb. 27, 1962 D. B. JAMES ETAL 3,023,278

FOUR WIRE LINE CONCENTRATOR CIRCUIT

Filed July 21, 1960 3 Sheets-Sheet 1

INVENTORS D. B. JAMES
K. P. KRETSCH
BY John C Albrecht
ATTORNEY

FOUR WIRE LINE CONCENTRATOR CIRCUIT

Filed July 21, 1960 3 Sheets-Sheet 2

INVENTORS D. B. JAMES
K. P. KRETSCH
BY John C Albrecht
ATTORNEY

FOUR WIRE LINE CONCENTRATOR CIRCUIT

Filed July 21, 1960 3 Sheets-Sheet 3

INVENTORS D. B. JAMES
K. P. KRETSCH
BY John C Albrecht
ATTORNEY

United States Patent Office 3,023,278
Patented Feb. 27, 1962

3,023,278

FOUR WIRE LINE CONCENTRATOR CIRCUIT

Dennis B. James, Far Hills, and Kenneth P. Kretsch, Harding Township, Morris County, N.J., assignors to Bell Telephone Laboratories, Incorporated, New York, N.Y., a corporation of New York Filed July 21, 1960, Ser. No. 44,303
10 Claims. (Cl. 179—18)

This invention relates in general to telephone switching systems and more particularly to time division multiplex telephone systems wherein four wire subscriber stations are employed.

Telephone communication systems exclusive of toll transmission facilities generally employ two wire communication paths. A telephone subscriber station, however, is inherently a four wire device in that it has a transmitter and receiver. A subset circuit located at the subscriber station converts the four wire transmitter and receiver circuit to a two wire circuit for transmission to the central office. In local office calls, the adverse transmission effects of two wire to four wire conversion are not of substantial importance; however, where communication is to be established between stations separated by great distances, amplification must be inserted in the transmission paths to overcome the inherent transmission losses and in such systems two wire to four wire conversion presents certain problems. In present day local switching systems, subscribers are connected through the various switching networks by bidirectional two wire communication paths; however, in the case of long distance calls, a conversion is generally made at a toll switching center from the subscriber's two wire bidirectional path to a four wire communication path having separate unidirectional send and receive paths arranged in opposite sense.

The use of two wire circuits is basically a matter of economics. In present day local telephone switching systems, the cost of cable pairs from a subscriber's station to a central office is costly and the use of two pairs for each subscriber station rather than one pair imposes an undue economic burden. Where remote concentrators are employed, the distance from subscriber stations to the remote concentrator is relatively short and, in addition, in such situations it is possible to employ cable pairs of smaller conductors. For short subscriber loops the four wires of the transmit and receive pairs of a four wire subscriber's station may require no additional metal over that required to provide a single pair of equal length in present day two wire systems. Accordingly, four wire transmission facilities from a concentrator to a subscriber's station may be provided with only a nominal increase in cost for the wire facilities as compared to two wire facilities of equal length.

In space division toll transmission systems, i.e., systems which employ a plurality of transmission paths which are assigned to one call at a time, a repeating coil hybrid circuit is employed to make the conversion from two wire to four wire transmission. Ideally, there is zero coupling between the receiving leg of the four wire transmission path and the sending leg thereof; however, practically, some of the received energy is always coupled to the send leg as it is impossible to achieve a perfect hybrid balance between the two wire line and the hybrid balance network for all frequencies of transmitted signal.

In the copending application of D. B. James, J. D. Johannesen, M. Karnaugh, and W. A. Malthaner, Serial No. 760,502, which is now Patent No. 2,957,949, issued October 25, 1960, there is disclosed a time division multiplex pulse code modulation telephone switching system which employs a time division hybrid circuit in a concentrator for coupling the two wire subscriber lines to the four wire transmission facilities which are employed within the concentrator and between the concentrator and the central office switching network. A time division hybrid such as is employed in the above-noted James et al. application is disclosed in D. B. James et al. Patent 2,436,338 which issued on May 10, 1960. Ideally, a time division hybrid of this type in a concentrator is free of coupling between the receiving leg from the central office and the send leg back to the central office; however, again from a practical standpoint, the ideal situation is difficult to achieve and the coupling is generally such that the loss between the receiving leg and the sending leg is in the order of 25 db.

Four wire subscriber stations which employ independent send and receive paths avoid the two wire to four wire conversion in the above-noted time division system; however, there are two very serious problems attendant the use of four wire subscriber stations. These problems are concerned with the provision of side tone to a talking subscriber and the provision of communication between a main station and an extension of the main station. Where two wire subscriber stations are employed, these problems do not exist; however, where four wire subscriber stations are employed, there is no coupling between the transmitting leg of the subscriber station and the receiving leg thereof. The necessary transfer of energy between the transmitting leg and the receiving leg to provide side tone to a talking subscriber can be achieved through the use of a unidirectional amplifier individual to and located at the subscriber station. Such an arrangement, however, is unduly costly as one such coupling device is required for each four wire subscriber station. Alternatively, a unidirectional coupling path can be provided at the concentrator for each four wire subscriber station. This arrangement raises the same objection in that such circuits must also be provided on a per line basis.

It is an object of this invention to couple the transmitting leg of a four wire subscriber circuit to the receiving leg thereof without deteriorating the system transmission characteristics.

It is another object of this invention to permit communication between a main station and an extension station over a four wire telephone subscriber station.

In accordance with one feature of this invention, four wire communication paths are employed between the subscriber station and a concentrator serving such stations.

In accordance with another feature of this invention, side tone transmission to the receiver of a four wire subscriber station is accomplished by means of common gating and storage means in a remote concentrator.

In accordance with another feature of this invention, coupling between the transmitting leg of a four wire subscriber station and the receiving leg thereof by way of common means comprising input gating means, storage means, and output gating means provides communication between a main station and extension stations of a four wire telephone subscriber's station.

In accordance with another feature of this invention, the common receiving and sending means in a time division multiplex concentrator are separate means and the coupling of energy from the receiving means to the sending means is minimized.

In accordance with another feature of this invention, a subscriber's transmitting filter reduces to a single capacitor in shunt with the four wire transmit line coil.

The above-noted objects and features of this invention can best be understood with reference to the drawing in which.

Figure 2:
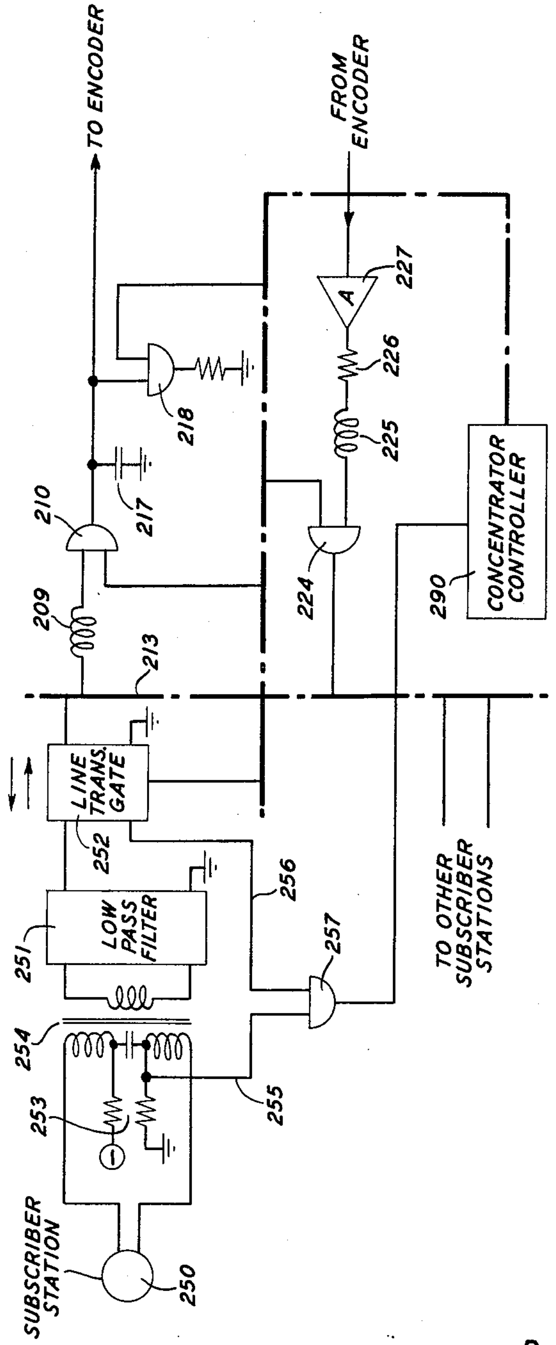
FIG. 2 is a schematic representation of a two wire subscriber station and the time division hybrid arrangements of the above-mentioned James et al. Patent 2,936,338.

The subject invention and its advantages may be more readily understood in light of an understanding of the prior art time division hybrid circuit of FIG. 2 and the problems attendant thereto. Although a time division hybrid provides circuits having adequate transmission characteristics, including a sufficiently high return loss, for use in local telephone switching systems, there is, however, sufficient cross-coupling between the receive and send legs of the four wire transmission path to bring about a problem where stations separated by great distances are to be interconnected.

Figure 3:
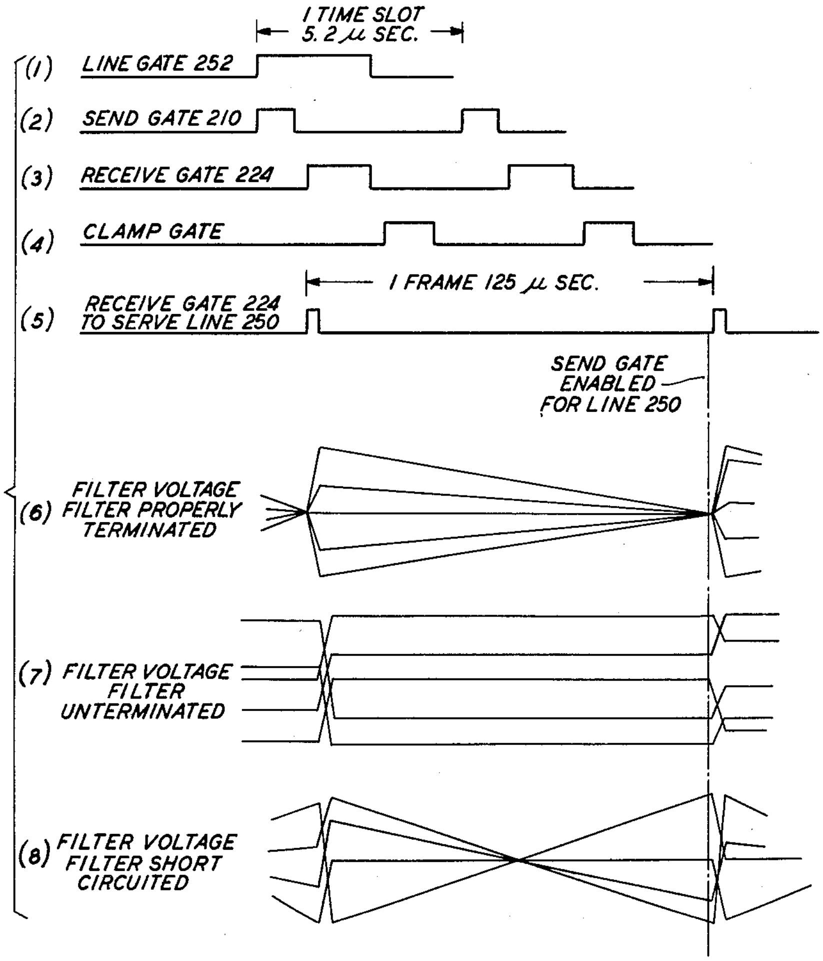
FIG. 3 is a time diagram showing the time of operation of various elements of FIG. 2 and the effects of electrical termination of the hybrid of FIG. 2.

In the prior art arrangement of FIG. 2, the subscriber's station 250 has a subset circuit which is not shown, for converting the four wire transmitter and receiver circuit to a two wire circuit for transmission to the line circuit and the time division hybrid in the remote concentrator. The line circuit includes the transmission bridge and scanning resistors 253, the coil 254, the low pass filter 251 and the bidirectional transmission gate 252. The common transmission bus 213, which is a portion of the time division hybrid, is employed alternately for transmitting from and to the subscriber's station 250. Other subscriber stations and line circuits are connected to the common transmission bus 213 as indicated in FIG. 2. The means in the concentrator controller 290 for controlling the gates of FIG. 2 are not shown in detail; however, the times of operation of the various gates of FIG. 2 are shown in FIG. 3. In one illustrative embodiment, the time division system employs an order of time wherein a frame of 125 microseconds duration comprises 24 time slots and each time slot comprises 8 information bit times. As shown in FIG. 3, the line gate 252 is enabled for 4½ bit times which is slightly more than one-half of the eight bit time slot. The send gate 210 is enabled simultaneously with the enablement of the line gate 252; however, the send gate is released 1½ bit times after it is enabled as this provides sufficient time to sample the information present at the subscriber's line circuit and to store the sample on the capacitor 217. One-half bit time after the send gate 210 is released, the receive gate 224 is enabled and the information sample from the decoder is transferred through receive gate 224 and the line transmission gate 252 to the subscriber's station 250. The receive gate 224 and the line gate 252 are simultaneously disabled and immediately thereafter the capacitor 217 which was connected to the encoder during the time the receive gate 224 was enabled is now clamped to ground potential in preparation for receipt of the speech sample from the line served in the next succeeding time slot.

In FIG. 3, lines 1—4 are drawn to a first time scale while lines 5—8 are drawn to a greater time scale. In line 5 of FIG. 3, it is seen that 125 microseconds pass between successive enablements of the receive gate 224, when serving line 250, and from lines 2 and 3 of FIG. 3 it is seen that the line gate 252 and the send gate 210 are enabled just prior to each enablement of the receive gate 224. Accordingly, a line is sampled for sending slightly less than 125 microseconds after a speech sample is received from the distant station.

In FIG. 3, lines 6—8, there are shown time diagrams of the voltages present at the line filter 251 of FIG. 2 under various conditions of filter electrical termination. In FIG. 3, line 6, the filter is assumed to be perfectly terminated and it is seen that for various values of positive and negative samples transmitted from the receive gate 224 through the line gate 252, the voltages at the filter due to the various values of speech sample will run down or reduce to zero by the time the line is sampled to send information to the distant station. A perfect termination of the filter is an ideal situation and line 7 of FIG. 3 shows the voltage at the line filter 251 for various values of received signal when the filter is unterminated or terminated in an extremely high impedance. Line 8 of FIG. 3 shows the voltage at the line filter 251 for various values of signal when the filter 251 is terminated in an electrical short rather than in its characteristic impedance. As a practical matter, the termination of the line filter 251 resulting from a subscriber station and the connecting line is not ideal; however, it does not reach either of the two extreme cases set forth in lines 2 and 3 of FIG. 4 but rather is an approximation of the ideal case. In the practical case, the received speech sample, with reasonable lengths of line between the concentrator and the two wire subscriber station, runs down approximately 25 db below its original level; therefore, a signal in the order of 25 db below the received speech sample is added to or subtracted from the speech sample originating at the local subscriber and is encoded along with the subscriber's speech sample. There is, accordingly, in this mode of operation unwanted cross-coupling between the receive leg and the send leg. Further, the subscriber station equipment 250 does not electrically match the filter 251 for all frequencies within the transmitted band; therefore, there are slight reflections of the received signal from the subscriber station back to the filter and these reflected signals are also encoded and retransmitted to the distant station.

Figure 1:
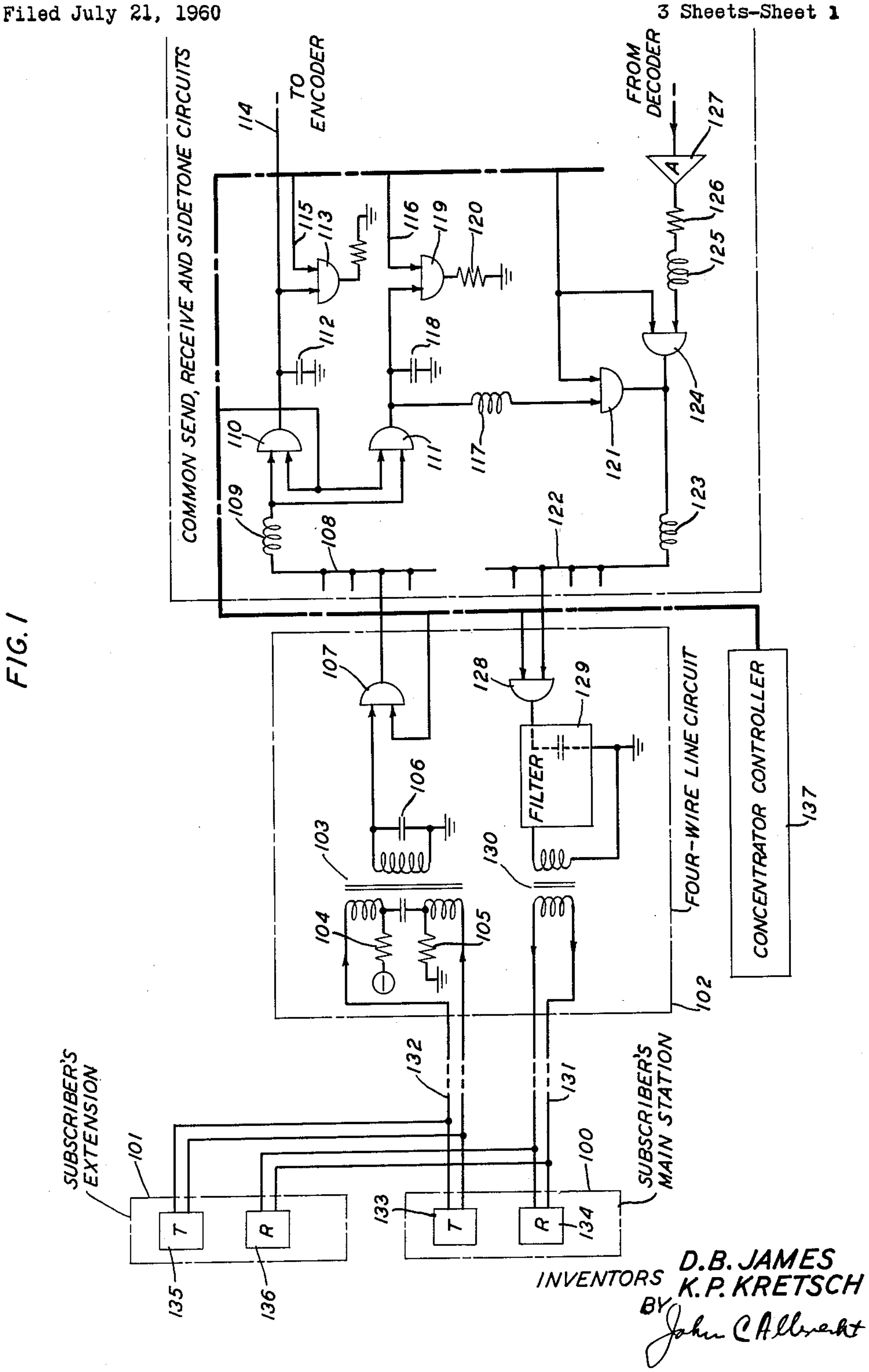
FIG. 1 is a schematic representation of a four wire subscriber station and the common send, receive and side tone circuits in the concentrator of a time division multiplex telephone switching system in accordance with this invention.

The use of four wire subscriber stations eliminates both undesired coupling between the receiving leg and the transmitting leg and reflections of received energy from the subscriber station into the transmitting leg; however, a four wire subscriber station must be arranged to permit communications between a subscriber's main station and side tone must be provided to a talking subscriber. In FIG. 1, there is shown a four wire subscriber station and the common send, receive and side tone circuits in accordance with this invention. The details of the concentrator controller 137 for enabling and disabling the transmission gates at the appropriate times are not shown. These gates can be readily operated in accordance with the teachings of the above-noted copending application of D. B. James, J. D. Johannesen, M. Karnaugh, and W. A. Malthaner, Serial No. 760,502, which is now Patent No. 2,957,949. It is sufficient for an understanding of this invention to recognize, as set forth, in FIG. 4, the times at which the various transmission gates are enabled and disabled. In FIG. 1, there are shown a subscriber's main station 100 comprising a transmitter 133 and a receiver 134; a subscriber's extension 101 of the main station 100 also comprising a transmitter 135 and a receiver 136; a transmitting line 132 from the subscriber's station to the concentrator; a receive line 131 from the concentrator to the subscriber's station; a four wire line circuit comprising the transformer 103, transmission bridge and scanning resistors 104 and 105, capacitor 106, the subscriber's transmitting line gate 107, the subscriber's receiving line gate 128, the receiving filter 129, and receiving transformer 130. The capacitor 106 in shunt with coil 103 advantageously provides sufficient filtering for the four wire transmitting leg.

In the right hand side of FIG. 1, there are shown the common send, receive, and side tone circuits which are employed in common by all subscriber stations served by the concentrator. The concentrator common send circuit comprises the common bus 108, the transmitting coil 109, the input send gate 110, the storage capacitor 112, the clamp gate 113, and the sending line 114 which is connected to the encoder through an output send gate which is not shown. The common receiving circuit comprises the amplifier 127 which is arranged to raise the output signal from the decoder to a desired output level, the series resistor 126, the coil 125, receive gate 124, the coil 123, and the receiving common bus 122.

In the absence of additional apparatus, over that noted above, there is no coupling between the transmitters 133 and 135 and the receivers 134 and 136. Accordingly, a subscriber talking into the transmitter 133 does not hear normal side tone in the receiver 134 and a subscriber listening at the extension 101 cannot hear the speech signals which originated at the main station 100. Similarly, a subscriber talking into the transmitter 135 of the extension station 101 similarly does not hear side tone and again what is said into the transmitter 135 is not heard at the main station receiver 134. As noted earlier, it is possible to insert unidirectional coupling means at the subscriber station or at the four wire line circuit between the transmitting leg and the receiving leg to provide the required communication. Such arrangements, however, must be provided on a per line basis and therefore are unduly costly.

Figure 4:
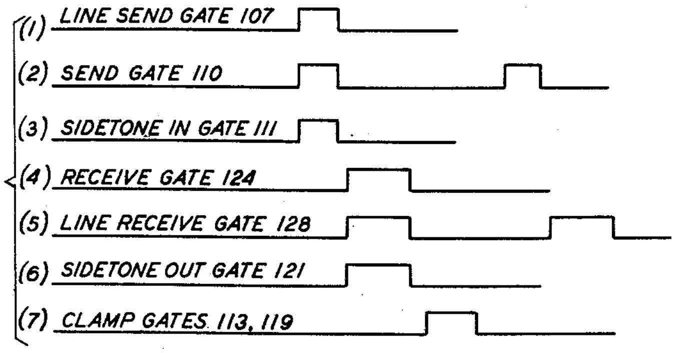
FIG. 4 is a time diagram of the sequence of events in the arrangements of FIG. 1.

Advantageously, in accordance with this invention, a common side tone circuit comprising the side tone input gate 111, the side tone storage capacitor 118, the side tone clamp gate 119, transmission coil 117, and the side tone output gate 121 is employed to provide the desired coupling between the transmitting leg of a four wire subscriber's station and the receiving leg thereof. As previously noted the means within the concentrator controller 137 for controlling the various transmission gates of FIG. 1 are not shown in detail and it is assumed that these gates are operated in accordance with the teachings of the above-noted James et al. application Serial No. 760,502, which is now Patent No. 2,957,949. The sequence of operation of the various gates is shown in FIG. 4.

A subscriber's line is sampled to obtain information for transmission to the distant station via the encoder and to obtain a pulse amplitude modulation sample for transmission to the receiving leg of the four wire circuit via the common side tone circuit. Subsequently, the received sample from the decoder and the above-noted side tone sample are transmitted to the receiving leg of the four wire circuit. As seen from lines 1, 2 and 3 of FIG. 4, the line send gate 107, the common send gate 110 and the side tone in gate 111 are enabled and disabled simultaneously. Each of these gates is enabled for 1½ bit times. The common receive output gate 124, the side tone output gate 121, and the line receive gate 128 are all enabled one-half bit time after the send sampling has been completed and are disabled 2½ bit times thereafter. The clamp gates 115 and 116 are enabled for 2 bit periods starting one-half bit period after the receive gates have been disabled. The transmitting and receiving sequence is accordingly completed in 7 bit periods of the 8 bit repetitive office cycle. That is, the send gates are enabled for 1½ bit times, the receive gates are subsequently enabled for 2½ bit times and the clamp gates are enabled for 2 bit times. The send and receive and the receive and clamp intervals in each case are separated by one-half bit times.

The energy sampled from the subscriber's line capacitor 106 is simultaneously stored on the send capacitor 112 and the side tone capacitor 118. If these capacitors are of equal electrical size, equal charges will be stored thereon; however, if these capacitors are not electrically equal, the energy obtained by sampling of the subscriber's send or transmitting circuit will be distributed in appropriate proportions between capacitors 112 and 118. The absolute value of charge stored in capacitor 112 is unimportant as amplification may be employed between the capacitor and the encoder or the decoder at the distant end may be arranged to provide any required amplification. The send gate 110 and the side tone gate 111 are simultaneously enabled and disabled and the sample period of 1½ bits, i.e., approximately .975 microsecond is sufficient to obtain a speech sample from a subscriber's line circuit. The receive period follows the send sample period time by approximately .3 of a microsecond and during the receive period, the energy on send capacitor 112 is transferred to the encoder, which is not shown, for conversion to a PCM code for transmission to the distant subscriber station and the sample from the side tone capacitor 118 is gated to the receiving line filter 129 through gates 121 and 128 along with an information sample, if present, from the distant subscriber's station. The information is transmitted from the send leg of the four wire subscriber's station to the receive leg via the side tone input and output gates 111 and 112 and the side tone storage capacitor 118 on a pulse amplitude modulation basis. Communication from the concentrator to the central office and from the central office to the concentrator indicated herein to be on a pulse code modulation basis may also be on a pulse amplitude modulation basis.

In summary, the transmission advantages which accrue through the use of four wire subscriber stations in a time division multiplex telephone switching system are maintained without loss of the necessary side tone transmission and without loss of communication between a main station and an extension station. Advantageously, the deficiencies of a normal four wire subscriber station are overcome by means of the common side tone circuit including an input gate, a storage capacitor, and an output gate.

It is to be understood that the above-described arrangements are illustrative of the application of the principles of the invention. Numerous other arrangements may be devised by those skilled in the art without departing from the spirit and scope of the invention.

What is claimed is:

1. In a time division telephone switching system having remote concentrators, the combination comprising a plurality of four wire subscriber stations having separate transmitting and receiving transmission means, a sending transmission means common to said plurality of stations; a receiving transmission means common to said plurality of stations; a side tone transmission means common to said plurality of stations; means for selectively and simultaneously connecting said common sending means and said side tone means to said sending transmission means of one of said plurality of subscriber stations, and means for subsequently, selectively and simultaneously connecting said side tone means and said common receiving means to said receiving transmission means of said one of said plurality of said subscriber stations.

2. A telephone switching system in accordance with claim 1 wherein said side tone means comprises a first gate means connected to said common sending means, a second gate connected to said common receiving means, means for storing an information sample, and means for conditioning said storage means.

3. A telephone switching system in accordance with claim 2 wherein said storage means comprises a capacitor.

4. A telephone switching system in accordance with claim 2 wherein said means for conditioning said storage means comprises gating means and resistive means connecting said storage means to a discrete potential source.

5. In a time division telephone switching system having remote concentrators, the combination comprising a plurality of four wire subscriber stations having separate transmitting and receiving transmission means, a sending transmission means common to said plurality of stations; a receiving transmission means common to said plurality of stations; a side tone transmission means common to said plurality of stations; means for selectively transferring energy from said transmitting means of said subscriber stations to said side tone transmission means, and means for selectively transferring energy from said side tone means to said receiving transmission means of said four wire subscriber stations.

6. A telephone switching system in accordance with claim 5 wherein said side tone means comprises input gating means connected to said common sending transmission means, storage means, output transmission means, and means for conditioning said storage means.

7. A telephone switching system in accordance with claim 6 wherein said output transmission means comprises a resonant transfer coil and output gating means.

8. A telephone switching system in accordance with claim 5 wherein said common sending transmission means comprises input transmission means, storage means, and means for conditioning said storage means.

9. A telephone switching system in accordance with claim 8 wherein said input transmission means comprises a resonant transfer coil and input gating means.

10. A telephone switching system in accordance with claim 5 wherein said receiving transmission means comprises a first resonant transfer coil, output gating means, and a second resonant transfer coil.

No references cited.